United States Patent
Zhu et al.

(10) Patent No.: US 11,706,001 B2
(45) Date of Patent: Jul. 18, 2023

(54) METHOD AND APPARATUS FOR BEAM MANAGEMENT

(71) Applicant: LENOVO (BEIJING) LIMITED, Beijing (CN)

(72) Inventors: Chenxi Zhu, Fairfax, VA (US); Bingchao Liu, Beijing (CN); Zhennian Sun, Beijing (CN); Hongmei Liu, Beijing (CN); Wei Ling, Beijing (CN); Yingying Li, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 69 days.

(21) Appl. No.: 16/962,910

(22) PCT Filed: Jan. 19, 2018

(86) PCT No.: PCT/CN2018/073431
§ 371 (c)(1),
(2) Date: Jul. 17, 2020

(87) PCT Pub. No.: WO2019/140639
PCT Pub. Date: Jul. 25, 2019

(65) Prior Publication Data
US 2021/0067289 A1 Mar. 4, 2021

(51) Int. Cl.
*H04L 5/00* (2006.01)
*H04B 7/08* (2006.01)
(Continued)

(52) U.S. Cl.
CPC ........... *H04L 5/0048* (2013.01); *H04B 7/063* (2013.01); *H04B 7/0617* (2013.01);
(Continued)

(58) Field of Classification Search
CPC .............. H04L 5/0048; H04W 72/042; H04W 72/0413; H04B 7/088; H04B 7/0617; H04B 7/0632
See application file for complete search history.

(56) References Cited

U.S. PATENT DOCUMENTS

2016/0192225 A1  6/2016  Ko et al.
2017/0317866 A1* 11/2017  Stirling-Gallacher ...................... H04L 5/1469

(Continued)

FOREIGN PATENT DOCUMENTS

CN  102271352 A  12/2011
WO  2019124983 A1  6/2019

OTHER PUBLICATIONS

PCT/CN2018/073431, "International Search Report and the Written Opinion of the International Search Authority" ISA/CN, State Intellectual Property Office of the P.R. China, Sep. 27, 2018, pp. 1-6.
(Continued)

*Primary Examiner* — Redentor Pasia
(74) *Attorney, Agent, or Firm* — Kunzler Bean & Adamson (57) ABSTRACT

The present disclosure relates to methods and apparatuses. According to some embodiments of the disclosure, a method comprises: receiving, at a user equipment (UE), a request to determine a spatial information for configuring a sounding reference signal (SRS) resource, and transmitting the SRS resource according to the spatial information determined by the UE.

20 Claims, 7 Drawing Sheets

(51) Int. Cl.
*H04W 72/21* (2023.01)
*H04W 72/23* (2023.01)
*H04B 7/06* (2006.01)

(52) U.S. Cl.
CPC .......... *H04B 7/0632* (2013.01); *H04B 7/088* (2013.01); *H04W 72/21* (2023.01); *H04W 72/23* (2023.01)

(56) References Cited

U.S. PATENT DOCUMENTS

| | | | |
|---|---|---|---|
| 2018/0042000 A1* | 2/2018 | Zhang | H04B 7/088 |
| 2018/0110066 A1* | 4/2018 | Luo | H04W 72/0413 |
| 2018/0205440 A1* | 7/2018 | Enescu | H04B 7/0417 |
| 2018/0206132 A1* | 7/2018 | Guo | H04W 72/0473 |
| 2018/0227035 A1* | 8/2018 | Cheng | H04B 7/0695 |
| 2018/0227094 A1* | 8/2018 | Liu | H04L 5/0094 |
| 2019/0058517 A1* | 2/2019 | Kang | H04B 7/0626 |
| 2019/0089499 A1* | 3/2019 | Nam | H04L 5/0048 |
| 2019/0116605 A1* | 4/2019 | Luo | H04B 7/088 |
| 2019/0132827 A1* | 5/2019 | Kundargi | H04W 72/12 |
| 2019/0141693 A1* | 5/2019 | Guo | H04W 72/042 |
| 2019/0159054 A1* | 5/2019 | Yiu | H04B 7/0408 |
| 2019/0190582 A1* | 6/2019 | Guo | H04W 72/046 |
| 2019/0215781 A1* | 7/2019 | Jeon | H04W 24/10 |
| 2019/0261320 A1* | 8/2019 | Yu | H04W 24/08 |
| 2019/0306924 A1* | 10/2019 | Zhang | H04L 5/0094 |
| 2020/0252241 A1* | 8/2020 | Park | H04L 25/0224 |
| 2020/0305007 A1* | 9/2020 | Chen | H04B 7/0695 |
| 2021/0281305 A1* | 9/2021 | Grant | H04L 5/0051 |

OTHER PUBLICATIONS

Samsung, On Beam Management, Measurement and Reporting, 3GPP TSG-RAN WG1 Meeting 91, R1-1720290, Nov. 27-Dec. 1, 2017, pp. 1-15, Reno, USA.

LG Electronics, Text proposals on UL beam management, 3GPP TSG RAN WG1 Meeting AH 1801, R1-1800363, Jan. 22-26, 2018, pp. 1-3, Vancouver, Canada.

Lenovo, Motorola Mobility, Discussion on non-codebook based UL transmission, 3GPP TSG RAN WG1 Meeting AH 1801, R1-1800397, Jan. 22-26, 2018, pp. 1-2, Vancouver, Canada.

* cited by examiner

METHOD AND APPARATUS FOR BEAM MANAGEMENT

TECHNICAL FIELD

The present disclosure is directed to wireless communication technology and, more particularly, to beam management in wireless communication.

BACKGROUND

Wireless communication systems are widely known in which base stations (also known as eNBs or gNBs, depending on the network type) communicate with mobile devices (also known as user equipments (UEs)) which are within range of the base stations. A mobile device may communicate with one or more base stations via transmissions on the downlink (or forward link) and uplink (or reverse link). The downlink (DL) refers to the communication link from the base station to the mobile device, and the uplink (UL) refers to the communication link from the mobile device to the base station.

Further, communications between mobile devices and base stations may be established via single-input single-output (SISO) systems, multiple-input single-output (MISO) systems, multiple-input multiple-output (MIMO) systems, and so forth. In a MIMO system, multiple antenna elements (e.g., antenna arrays) can be employed at the transmitter and/or at the receiver (often at both) to enhance the data capacity achievable between the transmitter and the receiver.

Using antenna arrays with many antenna elements (such as in a MIMO system), the transmitter can transmit the signal through a transmit (TX) beam in a certain direction to achieve TX beamforming gain, and the receiver can receive signal through a receive (RX) beam predominantly from a certain direction to enhance the received signal and nullify the interference from other directions.

Various reference signals (RSs) or RS measurements may be employed for selecting suitable TX/RX beam such that the signals would not be scattered in all directions. For example, in the DL, Synchronization Signal Block/Physical Broadcast Channel (SSB/PBCH), including Primary synchronization signal (PSS)/Secondary synchronization signal (SSS)/PBCH, and Channel State Information Reference Signal (CSI-RS) can be used for beam management.

It is desirable to improve both the delay and the accuracy of the beam management.

SUMMARY OF THE DISCLOSURE

According to some embodiments of the present disclosure, a method comprises: receiving, at a user equipment (UE), a request to determine a spatial information for configuring a sounding reference signal (SRS) resource; and transmitting the SRS resource according to the spatial information determined by the UE.

According to another embodiment of the present disclosure, a method comprises: transmitting, to a user equipment (UE), a request to determine a spatial information for configuring a sounding reference signal (SRS) resource; and receiving the SRS resource according to the spatial information determined by the UE.

Embodiments of the present disclosure also provide apparatuses for performing the above methods.

Embodiments of the present disclosure also provide non-transitory computer-readable media having stored thereon computer-executable instructions to cause a processor to implement the above methods.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Figure 1:
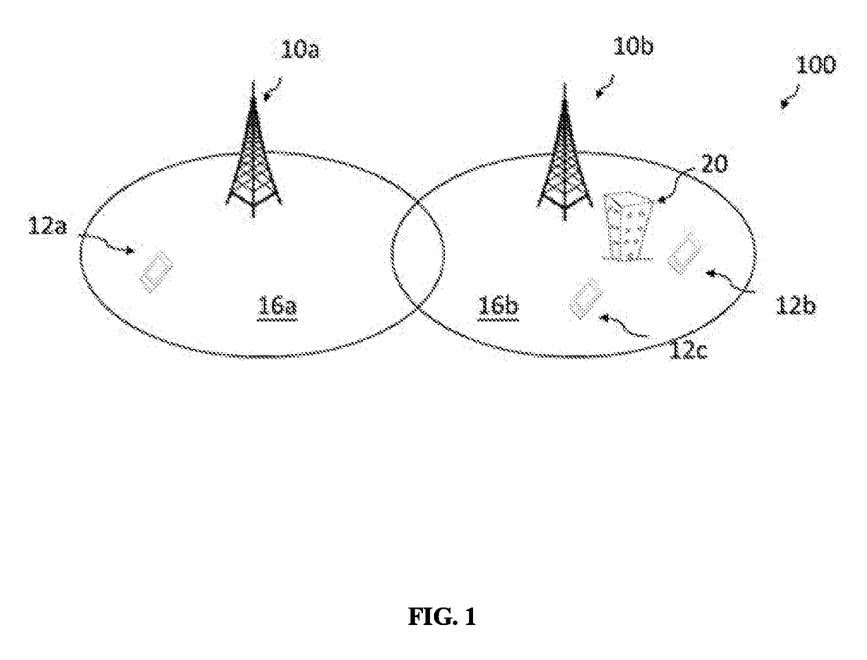
FIG. 1 illustrates a schematic wireless communication system according to some embodiments of the disclosure.

FIG. 1 illustrates a wireless communication system 100 according to some embodiments of the disclosure.

As shown in FIG. 1, the wireless communication system 100 includes a plurality of base stations including base stations 10a and 10b, and a plurality of UEs including UEs 12a, 12b and 12c. The plurality of base stations 10a, 10b may be based on the standards of 3G, long-term evolution (LTE), LTE-Advanced (LTE-A), 4G, new radio (NR), or other suitable standards. For example, the plurality of base stations 10a, 10b may be a plurality of eNBs, or a plurality of gNBs. In some embodiments of the disclosure, the plurality of base stations 10a, 10b may be controlled by a control unit (not shown). Each of the base stations 10a, 10b may define one or more cells, such as cell 16a or 16b, and each cell may support mobility management through the radio resource control (RRC) signaling. A group of cells 16a, 16b may form a radio access network-based (RAN-based) notification area (RNA). The UE 12a, 12b or 12c may be a computing device, a wearable device, and a mobile device, etc. The UEs with reference numerals 12a, 12b and 12c may represent the same UE moving in different locations within the coverage of the cell 16a or 16b, or different UEs. Persons skilled in the art should understand that as the 3GPP and the communication technology develop, the terminologies recited in the specification may change, which should not affect the principle of the disclosure.

Figure 2:
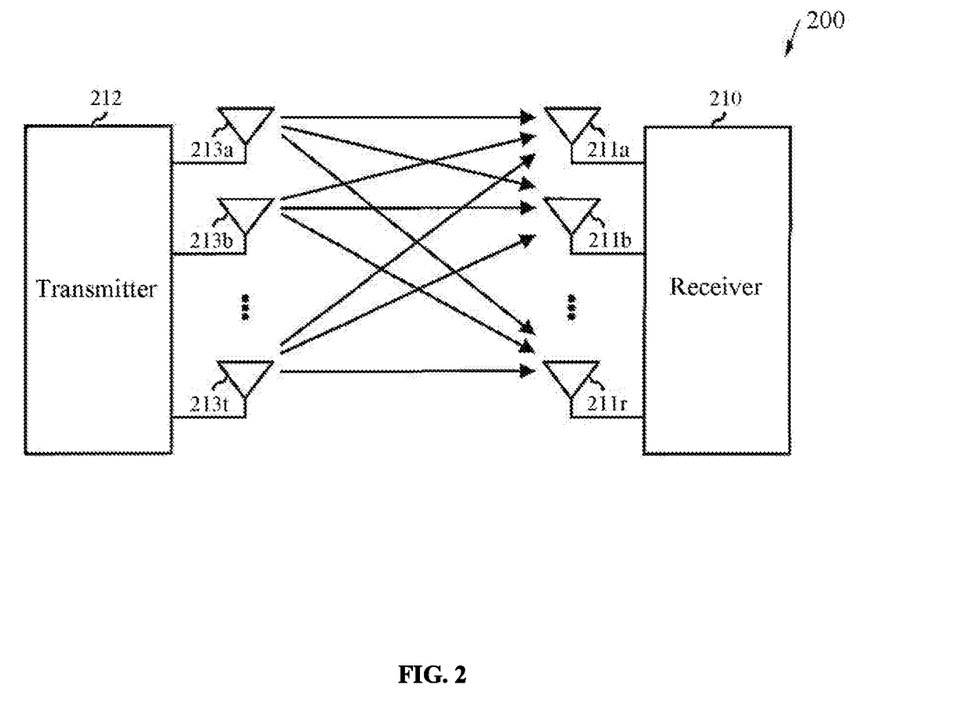
FIG. 2 illustrates a schematic MIMO communication system according to some embodiments of the disclosure.

FIG. 2 shows a MIMO communication system 200 including a receiver 210 and a transmitter 212 according to some embodiments of the disclosure. For DL transmission, the receiver 210 may be parts of a UE, and the transmitter 212 may be parts of a base station. For UL transmission, the receiver 210 may be parts of a base station, and the transmitter 212 may be parts of a UE. In some embodiments, a UE or a base station may include one or more receivers and one or more transmitters as shown in FIG. 2.

In FIG. 2, the transmitter 212 includes multiple (Nt) transmit (TX) antennas (i.e., antennas 213a, 213b, . . . and 213t), and the receiver 210 includes multiple (Nr) receive (RX) antennas (i.e., antennas 211a, 211b, . . . and 211r). The transmitter 212 may transmit signals through one or more TX beams of the TX antennas and the receiver 210 may receive signals through one or more RX beams of the RX antennas.

Beam management generally refers to the process of selecting at least one of the TX beam from the one or more TX beams and/or selecting at least one of the RX beam from the one or more RX beam such that the signal sent through the selected TX beam can be directionally transmitted to the selected RX beam.

Various RSs or RS measurements may be employed for selecting suitable TX/RX beams such that the signals would not be scattered in all directions. In the DL, SSB/PBCH (including PSS/SSS/PBCH) and CSI-RS can be used for beam management. In the UL, SRS is designed for the base stations to estimate the channel or beam quality based on the UL SRS transmitted by the mobile devices. SRS can also be used for beam management. For example, SRS is often used in conjunction with DL RS with TX/RX beam correspondence.

Before the mobile device transmits the SRS to the base station, the base station needs to configure SRS parameters for the mobile device. Generally, an SRS resource is configured by the base station (e.g, gNB) with a set of parameters including but not limited to configuration ID, triggering type, transmitting pattern (periodic/semi-persistent/aperiodic), number of ports, time/frequency resources, frequency hopping, cyclic shift, and spatial information. For example, in 3GPP TS38.214, V15.0.0, SRS configuration is defined as follows:

[6.2.1 UE Sounding Procedure

The UE can be configured with one or more Sounding Reference Symbol (SRS) resource sets as configured by the higher layer parameter SRS-ResourceSetConfig. For each SRS resource set, a UE may be configured with K≥1 SRS resources (higher later parameter SRS-ResourceConfig), where the maximum value of K is indicated by [SRS_capability [13, 38.306]]. The SRS resource set applicability is configured by the higher layer parameter SRS-SetUse. When the higher layer parameter SRS-SetUse is set to 'BeamManagement', only one SRS resource in each of multiple SRS sets can be transmitted at a given time instant. The SRS resources in different SRS resource sets can be transmitted simultaneously.

A UE shall transmit SRS resources based on the following trigger types:
  trigger type 0: higher layer signalling
  trigger type 1: DCI formats [TBD]

For trigger type 1, at least one state of the DCI field is used to select at least one out of the configured SRS resource set.

The following SRS parameters are semi-statically configurable by higher layer parameter SRS-ResourceConfig for trigger type 0 and for trigger type 1.

SRS-ResourceConfigId determines SRS resource configuration identify.

Number of SRS ports as defined by the higher layer parameter NrofSRS-Ports in Subclause 6.4.1.4 of [4, TS 38.211] for trigger type 0 and trigger type 1.

Time domain behaviour of SRS resource configuration as indicated by the higher layer parameter SRS-ResourceConfigType, which can be periodic, semi-persistent, aperiodic SRS transmission as defined in Subclause 6.4.1.4 of [4, TS 38.211].

Slot level periodicity and slot level offset as defined by the higher layer parameter SRS-SlotConfig in Subclause 6.4.1.4 of [4, TS 38.211] for an SRS resource of type periodic or semi-persistent.

Number of OFDM symbols in the SRS resource, starting OFDM symbol of the SRS resource within a slot including repetition factor R as defined by the higher layer parameter SRS-ResourceMapping in Subclause 6.4.1.4 of [4, TS 38.211] for trigger type 0 and trigger type 1.

SRS bandwidth $B_{SRS}$ and $C_{SRS}$, as defined by the higher layer parameter SRS-FreqHopping in Subclause 6.4.1.4 of [4, TS 38.211] for trigger type 0 and trigger type 1.

Frequency hopping bandwidth, $b_{hop}$, as defined by the higher layer parameter SRS-FreqHopping in Subclause 6.4.1.4 of [4, TS 38.211] for trigger type 0 and trigger type 1.

Defining frequency domain position and configurable shift to align SRS allocation to 4 PRB grid, as defined by the higher layer parameter SRS-FreqDomainPosition in Subclause 6.4.1.4 of [4, TS 38.211] for trigger type 0 and trigger type 1.

Cyclic shift, as defined by the higher layer parameter SRS-CyclicShiftConfig in Subclause 6.4.1.4 of [4, TS 38.211] for trigger type 0 and trigger type 1

Transmission comb value and comb offset as defined by the higher layer parameter SRS-Transmission Comb in Subclause 6.4.1.4 of [4] for trigger type 0 and trigger type 1.

SRS sequence ID as defined by the higher layer parameter SRS-SequenceId in Subclause 6.4.1.4 of [4] for trigger type 0 and trigger type 1.

The configuration of the spatial relation between a reference RS which can be an SSB/PBCH, CSI-RS or an SRS and the target SRS is indicated by the higher layer parameter SRS-SpatialRelationInfo.

The UE may be configured by the higher layer parameter SRS-ResourceMapping with an SRS resource occupying a location within the last 6 symbols of the slot.

When PUSCH and SRS are transmitted in the same slot, the UE may be configured to transmit SRS after the transmission of the PUSCH and the corresponding DM-RS.

A UE may be configured to transmit one or more precoded SRS on configured SRS resource(s), where the transmission of precoded SRS is based on precoder determination computed on the reference signals indicated by the higher layer parameters SRS-SpatialRelationInfo.

For a UE configured with one or more SRS resource configuration(s), and when the higher layer parameter SRS-ResourceConfigType is set to 'periodic':
  if the UE is configured with the higher layer parameter SRS-SpatialRelationInfo set to 'SSB/PBCH', the UE shall transmit the SRS resource with the same spatial domain transmission filter used for the reception of the SSB/PBCH, if the higher layer parameter SRS-SpatialRelationInfo is set to 'CSI-RS', the UE shall transmit the SRS resource with the same spatial domain transmission filter used for the reception of the periodic CSI-RS or of the semi-persistent CSI-RS, if the higher layer parameter SRS-SpatialRelationInfo is set to 'SRS', the UE shall transmit the SRS resource with the same spatial domain transmission filter used for the transmission of the periodic SRS.

For a UE configured with one or more SRS resource configuration(s), and when the higher layer parameter SRS-ResourceConfigType is set to 'semi-persistent':

when a UE receives an activation command [10, TS 38.321] for SRS resourceset in slot n, the corresponding actions in [10, TS 38.321] and the UE assumptions on SRS transmission corresponding to the configured SRS resource set shall be applied no later than the minimum requirement defined in [11, TS 38.133].

when a UE receives a deactivation command [MAC spec citation, 38.321] for activated SRS resourceset in slot n, the corresponding actions in [10, TS 38.321] and UE assumption on cessation of SRS transmission corresponding to the deactivated SRS resource set shall apply no later than the minimum requirement defined in [11, TS 38.133].

if the UE is configured with the higher layer parameter SRS-SpatialRelationInfo set to 'SSB/PBCH', the UE shall transmit the SRS resource with the same spatial domain transmission filter used for the reception of the SSB/PBCH, if the higher layer parameter SRS-SpatialRelationInfo is set to 'CSI-RS', the UE shall transmit the SRS resource with the same spatial domain transmission filter used for the reception of the periodic CSI-RS or of the semi-persistent CSI-RS, if the higher layer parameter SRS-SpatialRelationInfo is set to 'SRS', the UE shall transmit the SRS resource with the same spatial domain transmission filter used for the transmission of the periodic SRS or of the semi-persistent SRS.

For a UE configured with one or more SRS resource configuration(s), and when the higher layer parameter SRS-ResourceConfigType is set to 'aperiodic':

the UE receives a configuration of SRS resource sets, the UE receives a downlink DCI or an uplink DCI based activation command where a codepoint of the DCI may activate one or more SRS resource set(s).

if the UE is configured with the higher layer parameter SRS-SpatialRelationInfo set to 'SSB/PBCH', the UE shall transmit the SRS resource with the same spatial domain transmission filter used for the reception of the SSB/PBCH, if the higher layer parameter SRS-SpatialRelationInfo is set to 'CSI-RS', the UE shall transmit the SRS resource with the same spatial domain transmission filter used for the reception of the periodic CSI-RS or of the semi-persistent CSI-RS, if the higher layer parameter SRS-SpatialRelationInfo is set to 'SRS', the UE shall transmit the SRS resource with the same spatial domain transmission filter used for the transmission of the periodic SRS or of the semi-persistent SRS or of the aperiodic SRS.]

In the above configuration, when the parameter SRS-SpatialRelationInfo is defined for a SRS resource, set to either "SSB/PBCH" or "CSI-RS," the UE is required to transmit the SRS resource with the same spatial domain transmission filter used for the reception of the DL RS. When beam correspondence holds, the SRS is sent through the same beam as the DL RS in the UL direction to allow gNB to estimate the beam quality. Otherwise, when the parameter SRS-SpatialRelationInfo is set to "SRS," the UE is required to transmit the SRS resource with the same spatial domain transmission filter used for the transmission of a certain SRS.

Figure 3:
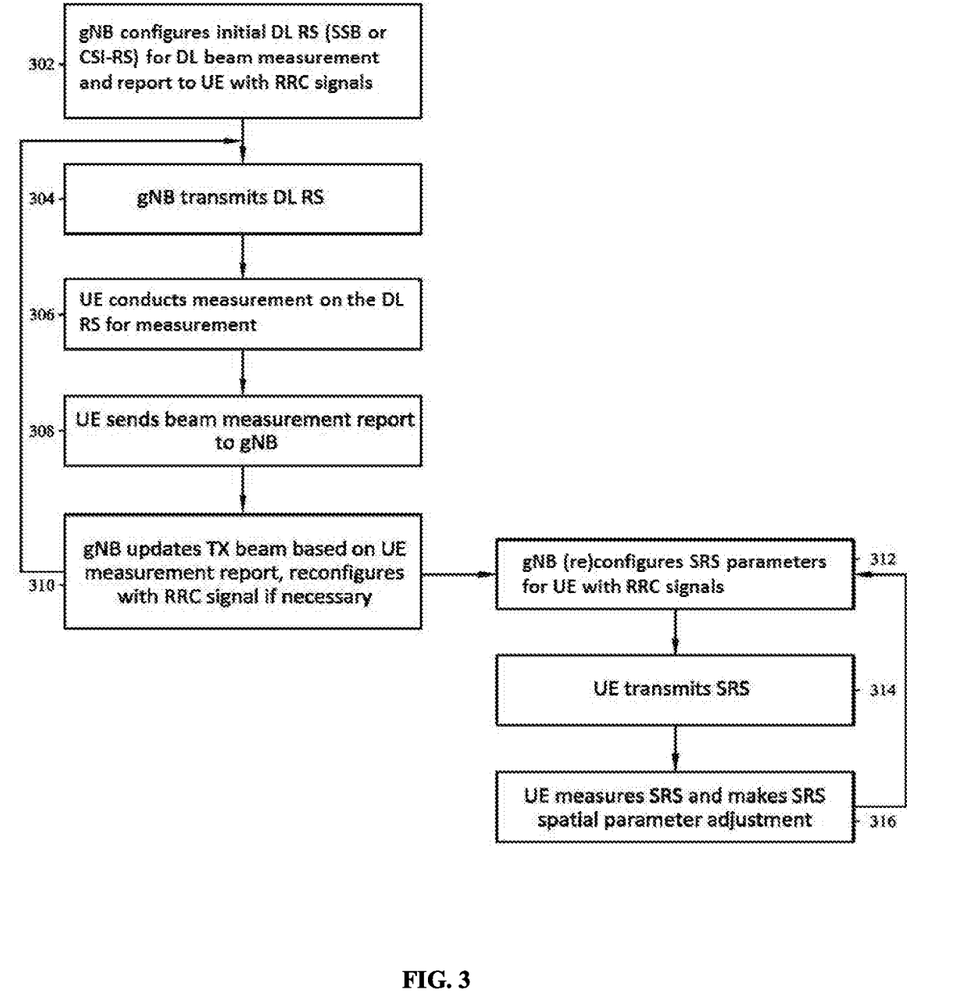
FIG. 3 illustrates a procedure for DL/UL beam management according to some embodiments of the disclosure.

FIG. 3 illustrates a procedure for DL/UL beam management according to some embodiments of the disclosure.

As shown in FIG. 3, in step 302, the base station (such as gNB) configures initial DL RS (SSB/PBCH and/or CSI-RS) for DL beam measurement for the mobile device (such as a UE), and reports the configuration to the UE with RRC signals. In step 304, gNB may transmit DL RSs to the UE. In step 306, the UE may conduct measurements on the DL RSs for measurement. In step 308, the UE may send a beam measurement report (e.g., L1-RSRP) to gNB. In some embodiments, the beam measurement report is a DL beam measurement report. In step 310, gNB may update SSB/PBCH and/or CSI-RS TX beam based on the beam measurement report, and reconfigure with RRC signals, if necessary. In some embodiments, steps 304 to 310 may be performed repeatedly for DL beam measurement.

In step 312, gNB may configure or reconfigure the SRS parameters for the UE with RRC signals. In step 314, the UE may transmit SRS resources according to the SRS parameters. In step 316, gNB may measure SRS and make adjustments on the SRS parameters, such as the spatial parameter SRS-SpatialRelationInfo. In some embodiments, steps 312 to 316 may be performed repeatedly for UL beam measurement.

Because the SRS resource is configured, gNB needs to instruct the UE which DL RS or a previously transmitted SRS resource can be used as a spatial reference relationship for the transmission of the SRS resource. However, gNB has no information regarding the quality of the DL beam (through which it transmits the DL SSB/PBCH or CSI-RS) until it receives a feedback beam measurement report (L1-RSRP) from the UE. Therefore, with insufficient information, gNB cannot configure the SRS with proper SRS parameters, such as SRS-SpatialRelationInfo. This delays the establishment of a UL beam (especially a good UL beam).

Moreover, because the SRS resource is configured with RRC signals, it usually has a long delay (about 10 milliseconds). For example, when gNB needs to update the SRS parameters, such as SRS-SpatialRelationInfo, based on the beam measurement report from the UE, gNB has to reconfigure the SRS parameters with RRC signals, which incurs tens of millisecond delay. In a fast moving environment, it may not be fast enough to track the fast moving beam or recover from beam failure.

Furthermore, although the measurements on the DL RS may be accurate, a quantization error (1-2 dB) may be introduced in the beam measurement report. For example, the beam measurement report may not include all the measurements on the DL RS.

Therefore, it is desirable to improve both the delay and the accuracy of the beam management.

Because the UE always conducts the beam measurement on the DL beams (SSB or CSI-RS) as configured by gNB, the UE always acquires information regarding the quality of the DL beams sooner than gNB, and gNB has no information regarding the quality of the DL beam until it receives the feedback beam measurement report from the UE. Therefore, the UE can use the DL beam information to configure the spatial information of its UL SRS beam autonomously without having to wait for gNB to configure the SRS-SpatialRelationInfo field through RRC signal. This can be done with the following mechanism.

Figure 4:
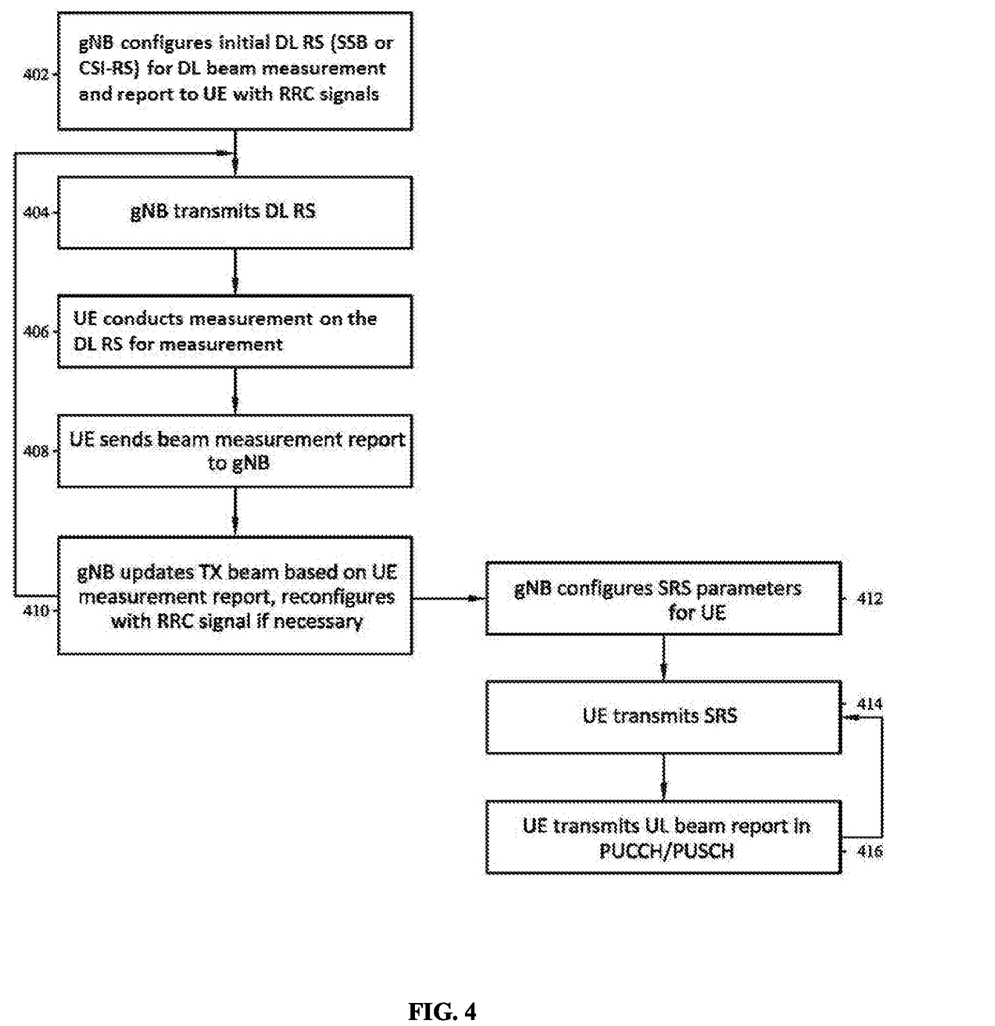
FIG. 4 illustrates a procedure for DL/UL beam management according to a further embodiment of the disclosure.

FIG. 4 illustrates a procedure for DL/UL beam management according to some embodiments of the disclosure.

As shown in FIG. 4, in step 402, the base station (such as gNB) configures initial DL RS (SSB/PBCH and/or CSI-RS) for DL beam measurement for the mobile device (such as a UE), and reports the configuration to the UE in a RRC signal. In step 404, gNB may transmit DL RSs to UE. In step 406, the UE may conduct measurements on the DL RSs for measurement.

In step 408, the UE may send a beam measurement report to gNB. In some embodiments, the beam measurement report includes all of the measurements on the DL RSs. In another embodiment, at least one of the measurements on the DL RSs is not included in the beam measurement report because the DL RS is too weak or is not configured for report. In yet another embodiment, a beam report message may be included in the beam measurement report. The beam report message includes the spatial information of the SRS resource, such as SRS-SpatialRelationInfo. The format of SRS-SpatialRelationInfo may be: {SRS-resourceId, spatial relation RS type (SSB, CSI-RS or SRS), nzp-csi-rs-ResourceId or SSB-index or SRS-resourceId}. In this case, the beam measurement report is a joint DL/UL beam report message. However, the beam report message may be transmitted as a separate UL beam report, which will be described below.

In step 410, gNB may update SSB/PBCH and/or CSI-RS TX beam based on the beam measurement report, and reconfigure with RRC signals, if necessary. In some embodiments, steps 404 to 410 may be performed repeatedly for the DL beam measurement.

In step 412, gNB may configure the SRS parameters for the UE. The SRS parameters include the spatial parameter SRS-SpatialRelationInfo of the UE. In some embodiments, gNb may include a request to determine spatial information for configuring the SRS resource in the configuration. In this case, the spatial parameter may be null, any arbitrary value, or a default value. For example, the SRS-SpatialRelationInfo field may be set to "N/A", absent, or "UE-determined." In another embodiment, gNB may configure the SRS parameters for the UE according to the spatial information of the SRS resource in the beam measurement report or a separate UL beam report.

In some embodiments, the UE may determine the spatial information of the SRS resource based on the measured qualities of the DL beams, i.e., the measurements on the DL RSs. With beam correspondence, the UE may choose a DL beam with a better beam quality (e.g., a beam with a strong radiation power) for SRS transmission. The UE may also determine the spatial information of the SRS resource based on a spatial domain reception filter of a DL RS resource. In some embodiments, the spatial information of the SRS resource includes a resource ID of the DL RS.

In another embodiment, the UE can transmit the SRS resource with spatial information unrelated with any DL RS.

In yet another embodiment, the UE may determine the spatial information of the SRS resource based on an arbitrary spatial domain transmission filter.

In still another embodiment, the UE may determine the spatial information of the SRS resource based on a spatial domain transmission filter of a previously transmitted SRS resource. The spatial information of the SRS resource may include a resource ID of the previously transmitted SRS resource. In some embodiments, the previously transmitted SRS resource is the last transmitted SRS resource.

In step 414, the UE may transmit the SRS resource according to the spatial information determined by the UE.

In step 416, the UE may transmit a UL beam report including the spatial information determined by the UE to gNB in Physical uplink control channel (PUCCH) or Physical Uplink Shared Channel (PUSCH). The spatial information includes the spatial parameter SRS-SpatialRelationInfo of the SRS resource. Similarly, the format of SRS-SpatialRelationInfo may be: {SRS-resourceId, spatial relation RS type (SSB, CSI-RS or SRS), nzp-csi-rs-ResourceId or SSB-index or SRS-resourceId}.

The UL beam report may be transmitted within one or more slots after the SRS resource is transmitted. A TX beam of the SRS resource may remain unchanged until the UL beam report is transmitted. In some embodiments, steps 414 to 416 may be performed repeatedly for UL beam measurement.

In some embodiments, the spatial information of the SRS resource may be determined based on the measurements on the DL RSs. With beam correspondence, the UE may choose a DL beam with a better beam quality (e.g., a beam with a strong radiation power) for SRS transmission. In another embodiment, the spatial information of the SRS resource may be determined based on a spatial domain reception filter of a DL RS resource. The spatial information of the SRS resource may include a resource ID of the DL RS.

In another embodiment, the SRS resource may be transmitted with spatial information unrelated with any DL RS.

In yet another embodiment, the spatial information of the SRS resource may be determined based on an arbitrary spatial domain transmission filter.

In still another embodiment, the spatial information of the SRS resource may be determined based on a spatial domain transmission filter of a previously transmitted SRS resource. The spatial information of the SRS resource may include a resource ID of the previously transmitted SRS resource. In some embodiments, the previously transmitted SRS resource is the last transmitted SRS resource.

In accordance with the embodiments shown in FIG. 4, the UE is allowed to choose the DL RS or SRS resource and transmit the UL SRS using spatial information related to the chosen DL RS or SRS resource in a quick manner. This would avoid not only the long delay incurred by the transmission of the DL beam measurement report sent by the UE, but also the delay of the RRC reconfiguration of the SRS resources. gNB can quickly obtain information regarding the SRS spatial relationship from the DL beam measurement report and/or the UL beam report sent by the UE through PUCCH or PUSCH. It also avoids the quantization error (1-2 dB) introduced in the UE beam measurement report. So it improves both the delay and the accuracy of the UL beam management.

Moreover, as mentioned above, some DL RSs (SSB or CSI-RS) are configured by gNB for the UE measurement but not for the report. Such DL RSs cannot be used by the current beam management scheme as shown in FIG. 3 because gNB does not know its beam quality (since it is not reported by UE). In accordance with the scheme shown in FIG. 4, the UE can associate a SRS with such DL RSs and send the association to gNB, and thus the scheme can potentially select from a larger set of DL RSs and choose a better UL beam.

Since the beam management is required in 5G (or NR) system when the carrier frequency is high (typically above 6 GHz), the above disclosure may improve the UL beam management in 5G system or other communication systems with the higher carrier frequency in many aspects.

Figure 5:
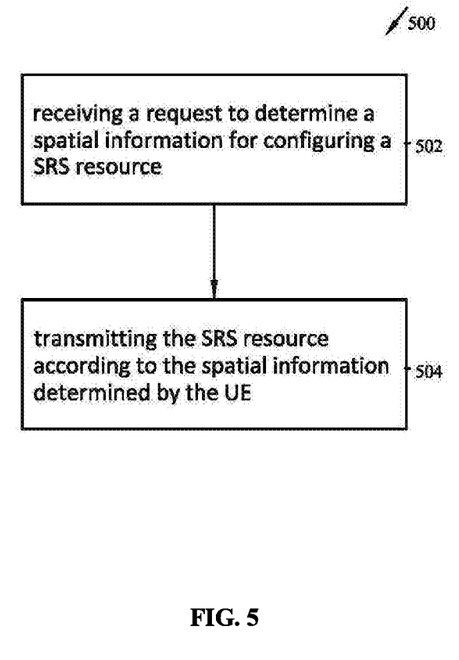
FIG. 5 illustrates a flow chart for a method for transmitting a SRS resource according to some embodiments of the disclosure.

FIG. 5 illustrates a flow chart for a method 500 for a UE transmitting a SRS resource according to some embodiments of the disclosure.

As shown in FIG. 5, in step 502, a request to determine a spatial information for configuring a SRS resource is received at the UE. In step 504, the SRS resource is transmitted according to the spatial information determined by the UE.

Figure 6:
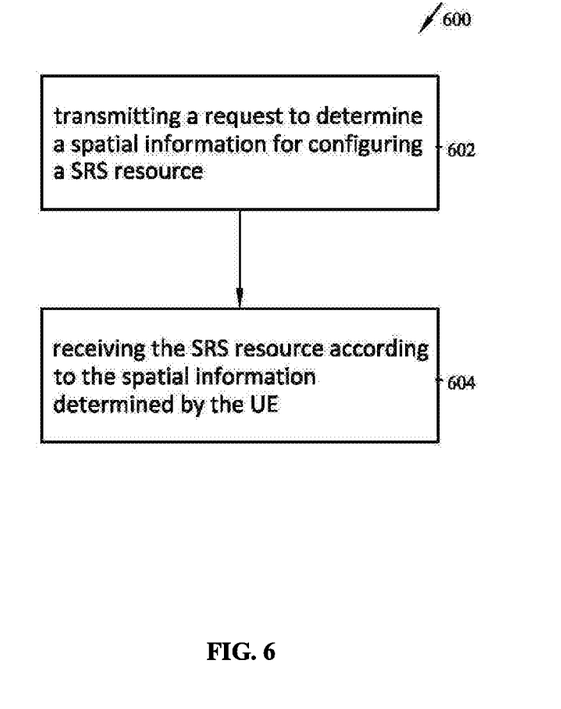
FIG. 6 illustrates a flow chart for a method for receiving a SRS resource according to some embodiments of the disclosure.

FIG. 6 illustrates a flow chart for a method 600 for receiving a SRS resource according to some embodiments of the disclosure.

As shown in FIG. 6, in step 602, a request to determine a spatial information for configuring a SRS resource is transmitted to a UE. In step 604, the SRS resource is received according to the spatial information determined by the UE.

Figure 7:
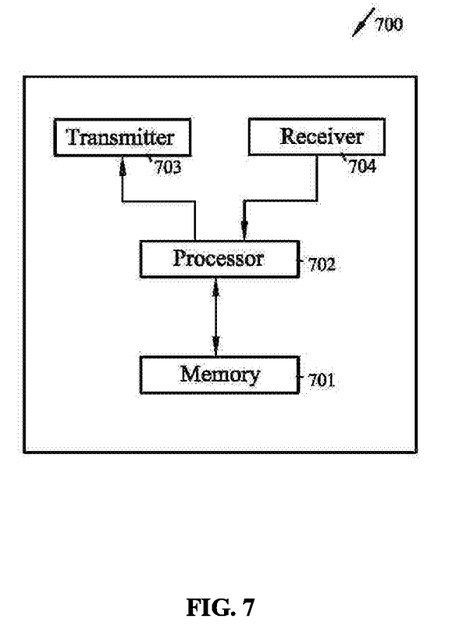
FIG. 7 illustrates a block diagram of an apparatus for transmitting or receiving a SRS resource according to some embodiments of the disclosure.

FIG. 7 illustrates a block diagram of an apparatus 700 for transmitting or receiving a SRS resource according to some embodiments of the disclosure. As shown in FIG. 7, the apparatus 700 may include a memory 701, a processor 702, a transmitter 703, and a receiver 704. Although in this figure, elements such as memory, processor, transmitter, and receiver are described in the singular, the plural is contemplated unless limitation to the singular is explicitly stated.

In some embodiments, the apparatus 700 may perform the method 500 as described above. In this case, the apparatus 700 may be a UE such as a computing device, a wearable device, and a mobile device. The apparatus 700 can communicate with a base station.

In other embodiments, the apparatus 700 may perform the method 600 as described above. In this case, the apparatus 700 may be a base station that can communicate with UE(s).

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

The invention claimed is:

1. A method, comprising:
receiving, at a user equipment, a request to determine a spatial information for configuring a sounding reference signal resource, wherein the request comprises a SRS-SpatialRelationInfo field value indicating the request for the user equipment to determine the spatial information, and the SRS-SpatialRelationInfo field value is set to 'UE-determined';
transmitting a beam report message, wherein the beam report message comprises an identifier of the sounding reference signal resource and a spatial relation type of the sounding reference signal resource; and
transmitting the sounding reference signal resource according to the spatial information determined by the user equipment.

2. The method of claim 1, wherein the beam report message includes the spatial information of the sounding reference signal resource.

3. The method of claim 2, further comprising:
receiving one or more downlink reference signals; and
measuring qualities of downlink beams through which the one or more downlink reference signals are transmitted.

4. The method of claim 3, further comprising transmitting a beam measurement report including the measured qualities of the downlink beams.

5. The method of claim 4, wherein the beam measurement report includes the beam report message.

6. The method of claim 4, wherein the beam report message is transmitted separately with the beam measurement report.

7. The method of claim 3, wherein the spatial information of the sounding reference signal resource is determined based on the measured qualities of the downlink beams.

8. The method of claim 3, wherein the spatial information of the sounding reference signal resource is determined based on a spatial domain reception filter of a downlink reference signal resource.

9. The method of claim 3, wherein the spatial information of the sounding reference signal resource includes a resource identification of a downlink reference signal.

10. The method of claim 4, wherein at least one of the measured qualities of the downlink beams is not included in the beam measurement report.

11. The method of claim 3, wherein the downlink reference signals comprise downlink Synchronization Signal Block/Physical Broadcast Channel and/or Channel State Information Reference Signal.

12. The method of claim 2, wherein the beam report message is transmitted within one or more slots after the sounding reference signal resource is transmitted.

13. The method of claim 2, wherein a transmit beam of the sounding reference signal resource remains unchanged until the beam report message is transmitted.

14. The method of claim 2, wherein the beam report message is transmitted in Physical uplink control channel or Physical Uplink Shared Channel.

15. The method of claim 1, wherein the spatial information of the sounding reference signal resource is related to an arbitrary spatial domain transmission filter.

16. The method of claim 1, wherein the spatial information of the sounding reference signal resource is determined based on a spatial domain transmission filter of a previously transmitted sounding reference signal resource.

17. The method of claim 16, wherein the previously transmitted sounding reference signal resource is the last transmitted sounding reference signal resource.

18. The method of claim 16, wherein the spatial information of the sounding reference signal resource includes a resource identification of the previously transmitted sounding reference signal resource.

19. A method, comprising:
transmitting, to a user equipment, a request to determine a spatial information for configuring a sounding reference signal resource, wherein the request comprises a SRS-SpatialRelationInfo field value indicating the request for the user equipment to determine the spatial information, and the SRS-SpatialRelationInfo field value is set to 'UE-determined';

receiving a beam report message, wherein the beam report message comprises an identifier of the sounding reference signal resource and a spatial relation type of the sounding reference signal resource; and receiving the sounding reference signal resource according to the spatial information determined by the user equipment.

20. The method of claim 19, wherein the beam report message includes the spatial information of the sounding reference signal resource.

\* \* \* \* \*